United States Patent [19]

Diamond

[11] Patent Number: 4,960,147
[45] Date of Patent: * Oct. 2, 1990

[54] VIBRATION ACTIVATED RELIEF VALVE

[76] Inventor: Harvey E. Diamond, 6518 Ellenview Ave., West Hills, Calif. 91307

[*] Notice: The portion of the term of this patent subsequent to Apr. 18, 2006 has been disclaimed.

[21] Appl. No.: 339,149

[22] Filed: Apr. 17, 1989

Related U.S. Application Data

[63] Continuation-in-part of Ser. No. 155,515, Feb. 12, 1988, Pat. No. 4,821,759.

[51] Int. Cl.⁵ .................................. F16K 17/36
[52] U.S. Cl. .......................... 137/45; 74/2; 74/527; 251/74
[58] Field of Search ............ 137/45; 251/74; 74/2, 74/527

[56] References Cited

U.S. PATENT DOCUMENTS

| 2,054,563 | 9/1936 | Hansen | 137/45 |
| 4,546,660 | 10/1985 | Bujold | 74/2 |

FOREIGN PATENT DOCUMENTS

| 109863 | 8/1980 | Japan | 137/45 |
| 12174 | 1/1982 | Japan | 137/45 |

Primary Examiner—Robert G. Nilson

[57] ABSTRACT

This disclosure is directed to a vibration or shock-activated valve. A valve mounted for rotation in a gas line or the like is connected to an elongate handle by a valve stem. The valve is spring activated to rotate from an open to a closed position. The elongate handle engages and is retrained by a ball detent. The ball detent has a ball supported on the engagement end of a conical end of a pendulum member. When vibration or shock moves the pendulum, the ball falls, releasing the elongate handle permitting the spring loaded valve to rotate from the open to the closed postion. A handle stop at 90° stops the valve in the closed position.

11 Claims, 3 Drawing Sheets

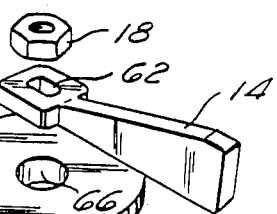
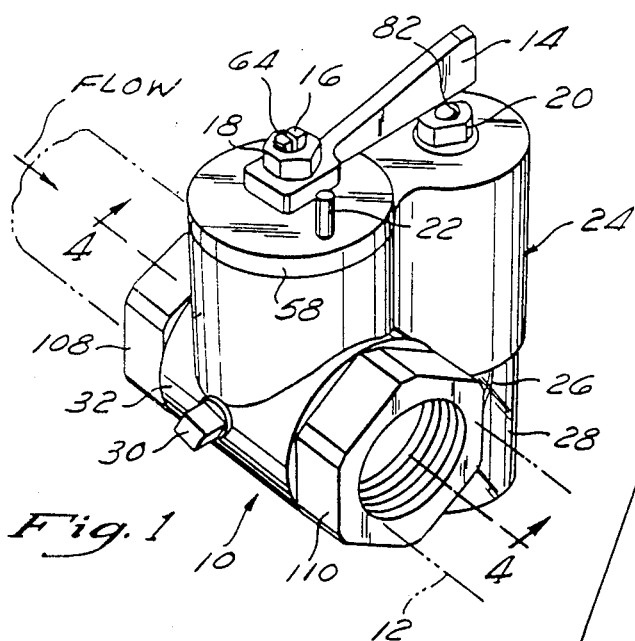
Fig. 1
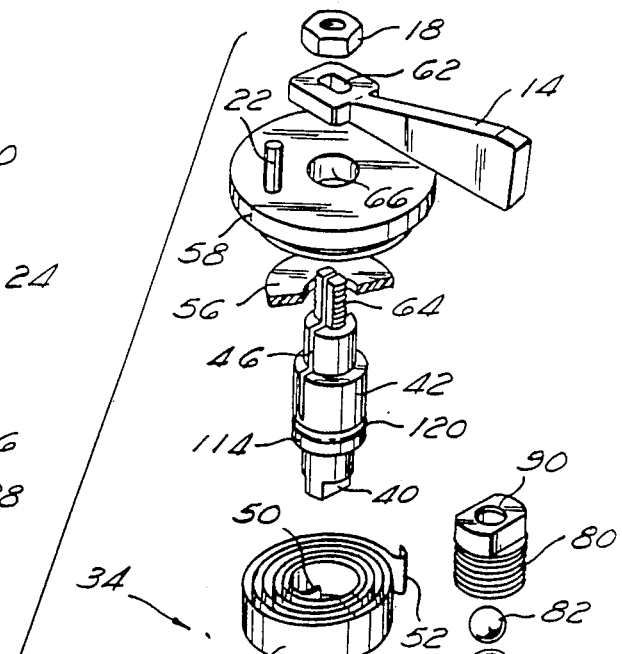
Fig. 2
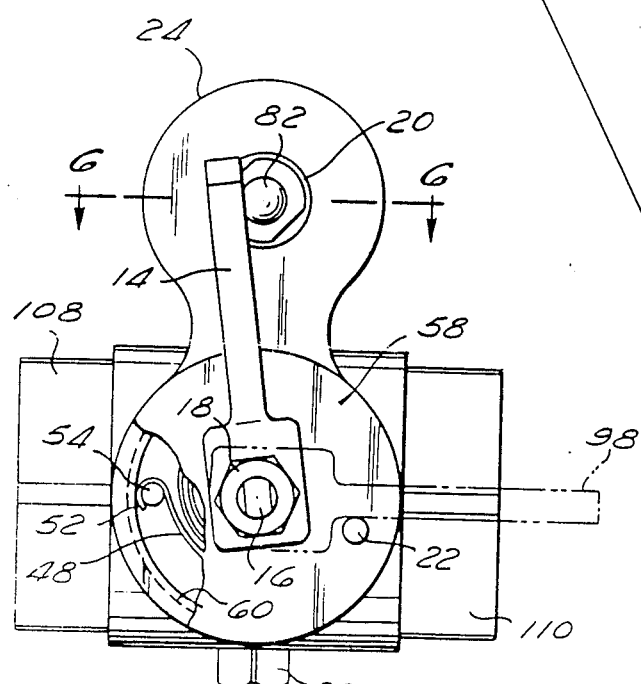
Fig. 3
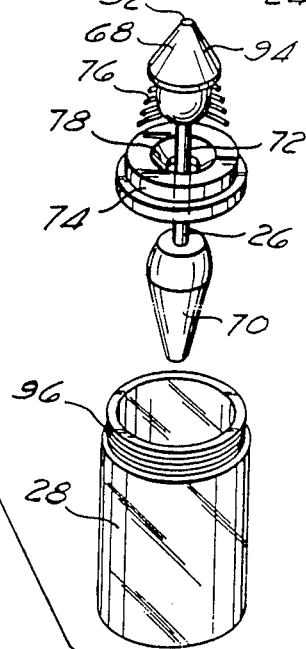

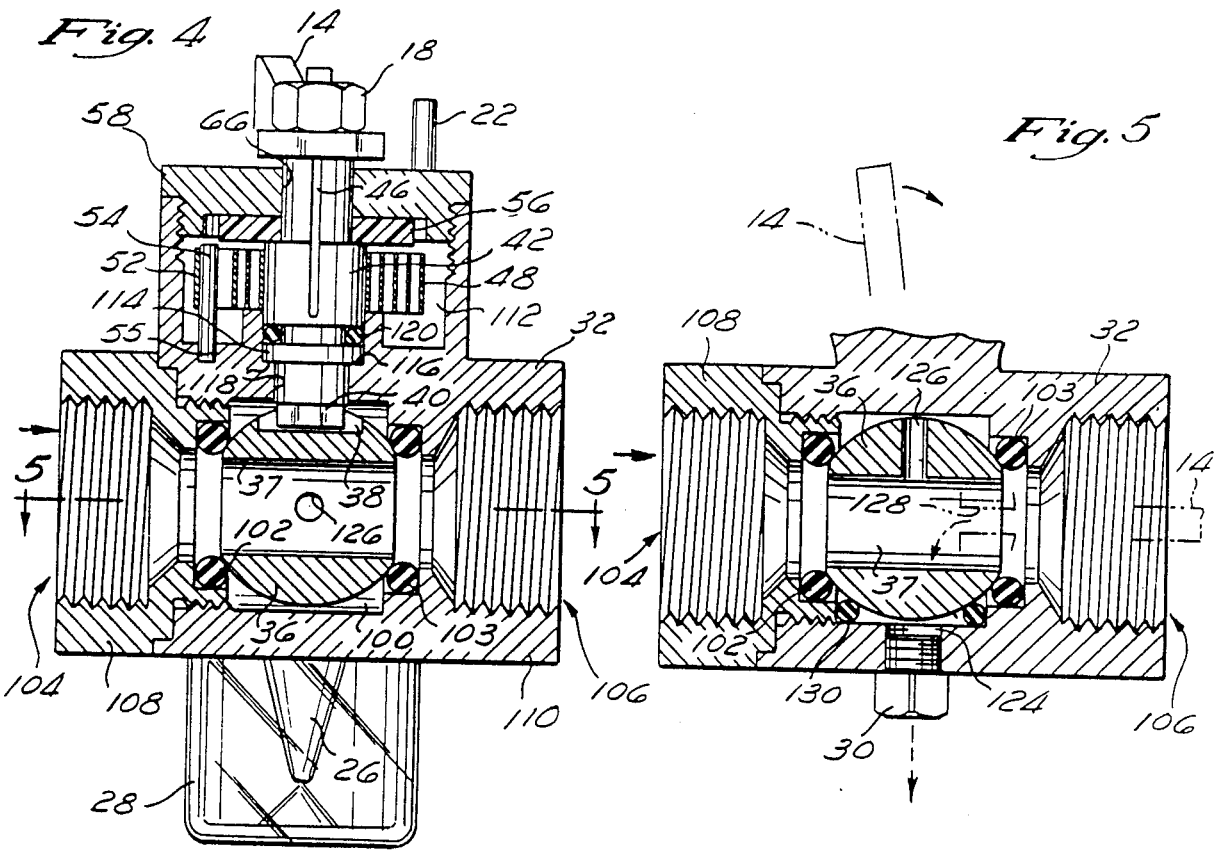
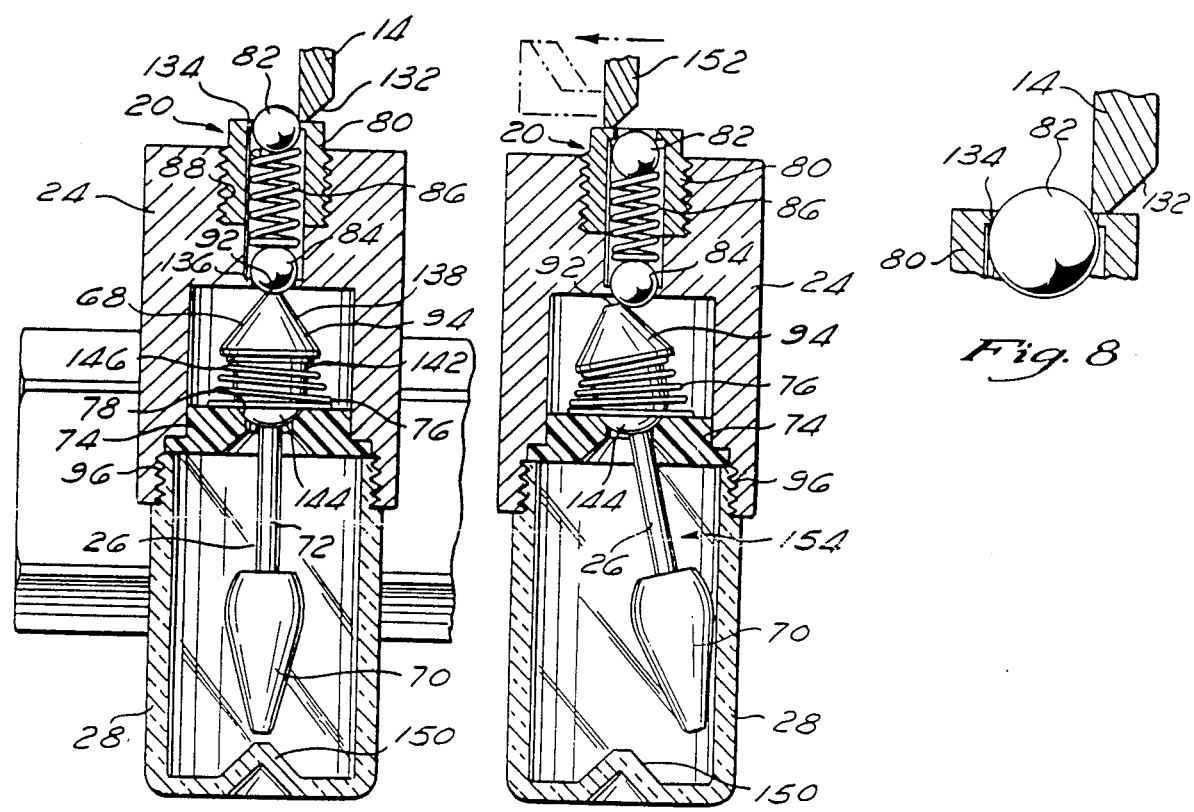

VIBRATION ACTIVATED RELIEF VALVE

This application is a continuation in part of U.S. application No. 155,515, now U.S Pat. No. 4,821,759, which disclosure is incorporated in full herein.

FIELD OF THE INVENTION

This invention relates to vibration and shock activated valves, particularly earthquake activated valves.

A wide variety of valves have been proposed to shut off fluids after an earthquake.

Sunde in U.S. Pat. No. 4,131,124 teaches a valve that has a spring loaded plate that seals a valve when a pendulum in direct contact with the plate valve stem unseats. A problem common to this and other plate type valves is ensuring a gas-tight seal between the plate and the valve. The other problem is sealing back pressure that may build up. Plates tend to be one-way valves.

Brandon in U.S. Pat. No. 2,255,965 teaches a valve that is generally similar to that of Sunde. Brandon's device has the problem of bulkiness and difficulty in installation.

Hansen in U.S. Pat. Nos. 2,158,753 and 2,054,563 teaches two different valves where a pendulum activates a plate type valve. Both are bulky and are difficult to reset after a shock.

Poff in U.S. Pat. No. 4,094,332 teaches a valve generally similar to those of Sunde and Brandon. Again the shut-off mechanism is complex.

Bujold in U.S. Pat. No. 4,546,660 teaches a mechanism that is bolted onto a standard gas line that turns the valve when a pendulum responds to vibration. Again, the apparatus is bulky.

MacNeilage in U.S. Pat. No. 3,890,993 teaches a flat valve activated when a pendulum swings.

Suzuki in U.S. Pat. No. 4,201,536 teaches a pendulum that falls, triggering a mechanism that closes the fuel valve. The pendulum is held by three ball bearings. The device is bulky.

Earthquakes are a threat throughout much of the world, particularly including California and Japan. Aside from the damage caused by shaking, the earthquake frequently ruptures pipelines, thereby causing a severe fire hazard. In the 1906 San Francisco earthquake, it is said that more damage was caused by the fire subsequent to the earthquake than by the shaking caused by the earthquake. Therefore, it is important that the flow of natural gas in pipelines, as well as other gases or liquids, be automatically stopped as soon as the shaking occurs.

It would be advantageous to have a valve that rotated closed in response to shock or vibration. Such a valve could remain in the closed position despite back pressure. In particular, a valve that rapidly responded to shock is preferred.

It would be further advantageous to have a valve that rotated shut and was easily reset.

It would be advantageous to have a shock activated valve where the shock responsive portion of the device was mechanically independent of the valve position.

SUMMARY OF THE INVENTION

This invention provides a vibration or shock-activated valve. A valve mounted for rotation in a gas line or the like is connected to an elongate handle by a valve stem. The valve is spring activated to rotate from an open to a closed position. The elongate handle engages and is restrained by a ball detent. The ball detent has a ball supported on the engagement end of a conical end of a pendulum member. When vibration or shock moves the pendulum, the ball falls, releasing the elongate handle permitting the spring loaded valve to rotate from the open to the closed position. A handle stop at 90° stops the valve in the closed position.

An aspect of this invention is:
a shock actuated shut-off valve comprising:
   a valve, having an open position and a closed position, rotatably mounted within a valve body;
   a valve stem connected to the valve;
   an elongated handle connected to the valve stem engagement end and having a ball detent engagement end;
   means for urging said valve to rotate into the closed position;
   means for stopping further rotation of the valve when the valve is in the closed position;
   a ball detent having a ball positioned to engage the ball detent engagement end of said elongate handle, thereby restraining said valve in the open position; and
   a pendulum having a ball detent engagement end and a plumb end, said pendulum responding to a vibration by freeing the ball detent, thereby allowing the valve to move to the closed position.

A further aspect of this invention is:
a shock sensitive ball detent comprising:
   a ball positioned to engage a movable member, thereby restraining the movable member; and
   a pendulum having a ball detent engagement end and a plumb end, the ball supported by the ball engagement end, said pendulum responding to a shock by allowing the ball to fall, thereby freeing said movable member.

BRIEF DESCRIPTION OF THE DRAWINGS

FIG. 1 shows a perspective view of the valve of the present invention.

FIG. 2 shows an exploded perspective view of the valve of the present invention.

FIG. 3 shows a top view of the valve of the present invention.

FIG. 4 shows a cut away view along 4—4 in FIG. 1.

FIG. 5 shows a cut away view along the line 5—5 in FIG. 4.

FIG. 6 shows a cut away view along the line 6—6 in FIG. 3, showing the ball detent restraining the elongate handle.

FIG. 7 shows the cut away view shown in FIG. 6 with the handle released.

FIG. 8 shows a detail of the ball detent restraining the elongate handle.

DETAILED DESCRIPTION OF THE PREFERRED EMBODIMENT

Figure 9:
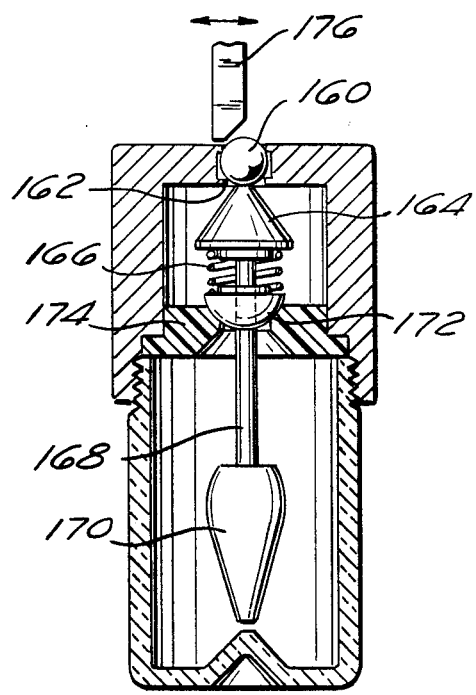
FIG. 9 shows a cut away view of a first alternate embodiment.

Referring to FIG. 1, the valve of the present invention 10 is attached to a gas line 12 (shown in phantom). An elongate handle 14 is secured to a rotatable valve stem 16 by a nut 18. The elongate handle as shown is in the valve open position, and is restrained from swinging to the valve closed position by a ball detent 20. A handle stop 22 is positioned to keep the handle in the valve closed position, if it is released. A bleed nut 30 is attached to the valve body 32. The bleed nut is optional.

A ball detent housing 24 houses the mechanism of the ball detent, and a pendulum 26 housed in a pendulum housing 28.

In FIG. 2, the valve assembly 34 and the pendulum and ball detent assembly are housed in the valve body.

The ball valve 36 has a gas or liquid passageway 37 and a key receiver 38 that mates with a key 40 on the lower portion of the rotatable valve stem 42. The ball valve is rotatable. When it is in the fluid passage position shown, the valve is open; when it has rotated 90°, the valve is closed. The ball is housed within the valve body as shown in phantom 44). The rotatable valve stem has a spring engagement slot 46. The spring engagement slot engages a valve spring 48 by an inner end 50. The valve spring rests inside the valve body with an outer end 52 of the spring hooked around a spring catch post 54 inserted in the valve body. The spring urges the rotatable valve stem into rotation. A washer 56 acts as bearing for the spring restraining it from contacting the valve assembly cap 58. The washer is made from a material that provides a bearing sealing surface. The spring is thereby prevented from riding up the valve stem.

A valve assembly cap 58 attaches to a cap receiver 60 in the valve body. The handle stop 22 should be positioned so that the elongate handle 14 will stop when the valve rotates 90°. The valve is then in the closed position.

The elongate handle has an oblong aperture 62 to receive a mating member 64 of the rotatable valve stem. The mating member extends through a valve stem aperture 66 in the valve assembly cap. The nut 18 engages the threads of the key, thereby securing the elongate handle to the valve stem.

A pendulum 26 has a first end 68 and a second end 70 joined by a pendulum 72 and surrounded by a pendulum support 74. A pendulum positioning spring 76 positions the pendulum. The first end rests in a receiving portion 78 of the pendulum support.

The ball detent includes a ball positioner 80 and a first ball 82 and a second ball 84 separated by a ball detent spring 86. The ball positioner is threadably engagable in a ball detent cavity 88 in the valve body. When assembled, an aperture 90 in the ball detent positioner allows the first ball to contact and restrain the elongate handle 14. The second ball contacts the flattened tip 92 of the conical portion 94 of the first end of the pendulum.

The pendulum support 74 is clamped between the top of the pendulum housing 28 and the ball detent housing 24, attached by threaded means 96. Pendulum support 74 is a bearing surface for the first end of the pendulum.

The elongate handle is the only communication between the valve assembly and the pendulum and ball detent assembly.

Referring to FIG. 3, the elongate handle 14 is restrained by the ball detent 20 in the valve open position. When the ball detent releases the handle it is urged into rotation by the valve spring 48. When the elongate handle is rotated to the valve closed position, it is restrained from further rotation (as shown in phantom 98) by the handle stop 22.

Referring to FIG. 4, the ball valve 36 is seated in the valve chamber 100, resting on a first 102 and a second 104 "O" ring gasket. In operation, gas or liquid would flow in from the inlet side 104 of the valve body, flow through the valve in the valve open position, and flow through the outlet side 106 of the valve body.

The gas inlet member 108 is threadably removable from the valve chamber member 110, thereby allowing access to the ball valve and surrounding gaskets. The gas inlet member and the valve chamber member form the valve body when mated together.

The ball key receiver 38 is mated with the lower key 40 of the rotatable valve stem 42. The rotatable valve stem extends through the valve body, past a valve spring cavity 112, and through the valve stem aperture 66 in the valve assembly cap 58. The rotatable valve stem has a shoulder 114 that rests on a support ledge 116 within a valve stem aperture 118 defined by the valve body. A third "O" ring gasket 120 seals the rotatable valve stem in the valve stem aperture. The outer end of the valve spring 48 is hooked around the spring catch post 54 inset in a catch post receiving relief 55 and the inner end is engaged in the spring engagement slot 46. A washer 56 acts as bearing for the spring restraining it from contacting the valve assembly cap 58. The washer is made from a material that provides a bearing sealing surface. The spring is thereby prevented from riding up the valve stem. The elongate handle 14 is positioned over the top end of the rotatable valve stem and secured with a nut 18. The valve assembly cap is attached to the valve chamber member. The valve is shown in the valve open position. When a shock or vibration moves the pendulum 26 in the clear pendulum housing 28, the ball detent releases the handle, which swings, until it contacts the handle top 22. Then the valve is in the valve closed position.

Referring to FIG. 5, the valve is shown in the valve open position. The valve passageway 37 allows gas to pass unhindered from the valve inlet 104 to the valve outlet 106. A removable bleed hole plug 30 covers a bleed hole 124.

When the ball valve is in the valve closed position, a valve bleed hole 126 is rotated to align with the valve outlet. The valve passageway (shown in phantom 128) is then aligned with the bleed hole. Pressure in the line downstream from the valve can be reduced by removing the valve bleed hole plug and allowing gas or liquid to flow through the valve bleed hole, through the gas or liquid passageway 37 and out the bleed hole. A fourth "O" ring gasket 130 provides a seal to prevent high pressure gas or liquid from escaping through the bleed hole and valve passageway when the valve is in the valve open position and the bleed hole plug has been removed.

Referring to FIGS. 6, 7, and 8, the ball detent 10 releasably restrains the elongate handle 14. The first ball 82 contacts a detent claw 132 on the elongate handle. The first ball is urged through a ball opening in the ball positioner 80 by the ball detent spring 86. The first ball is restrained from being ejected from the ball detent positioner by a first ball positioner shoulder 134. The ball positioner is threadably mated to a ball detent cavity 88 defined in the valve body 32. The ball detent cavity provides a second ball positioner shoulder 136 that the second ball 84 rests on. The ball detent spring links the first ball and the second ball and provides spacing. The first end of the pendulum 68 is a solid piece that has two major components. A first component is a conical component 138, having a ball support 92 at the tip of the cone. The ball support can be flat or slightly indented. The second ball rests on the ball support. The base of the cone is joined to the second component 142, a bullet-shaped component having a cylindrical body piece that terminates in a hemispherical bearing piece 144. The hemispherical bearing piece rests on the receiving portion 78 of the pendulum support 74. A pendulum arm 72 extends through the hemispherical bearing piece. The pendulum positioning spring 76 supports the pendulum by contacting a spring support shoulder 146 formed by the base of the conical component that separates the conically shaped poriton and a bullet shaped portion. The pendulum arm ends in the attachment for the plumb member which provides the pendulum weight. The plumb member can be permanently affixed to the pendulum arm or it can be threadably attached thereby providing means for adjustment.

The pendulum housing 28 preferrably is transparent and has an upwardly pointing pendulum centering guide 150, allowing the pendulum to be accurately positioned by sight. The pendulum weight is then vertically oriented over the indentation during its initial installation.

The valve of the present invention includes two major sub units. The valve sub unit includes the ball valve, or other conventional rotatably closable valve device, the valve stem and the elongate handle. The ball detent includes the ball and spring assembly and the pendulum. Although the two assemblies are side by side, the only linkage is the elongate handle, which is held or released by the ball detent.

The valve of the present invention is made of a material appropriate to the liquid or gas passing through it. Brass is used for fittings in water or natural gas lines. Stainless steel, nickel and other similar materials can be used for more corrosive gases or liquids. Plastic can be used for some applications, for example, in water lines.

The valve body can be one piece or two or more joined by welding, soldering or other conventional methods.

The various seals, particularly the "O" ring gaskets, have been provided as they would be present in a gas valve. The purpose of the seals is to insure that gas does not leak from the valve stem assembly in operation. Furthermore, it is important that the valve provide a gas-tight seal in the case of a shock.

It should be appreciated by those skilled in the art that a variety of other mechanisms can be used such as a spring means to rotate the valve into a closed position. Beside springs, hydrolic and pneumatic returns can be used. The only requirement that the return must have is that it store enough energy to close the valve when the valve is in operation.

In FIG. 7, when the pendulum oscillates, the second ball 84 is unseated and falls. The first ball falls enough for the handle to be released. It is restrained from falling into the pendulum housing by the second ball positioner shoulder, which allows it to wedge the pendulum at an angle 154. This allows the first ball to fall enough that the elongate handle is no longer restrained from moving 152. The pendulum can move in response to motion from any direction, and any such motion will release the elongate handle. It will be appreciated that the pendulum will normally be aligned, even if the handle is released. The pendulum will not be centered only if an external vibration or shock is present.

Once the elongate handle is released by the ball detent, the valve stem will respond to the urging of the valve spring and rotate until the handle contacts the handle stop. As the handle rotates, so does the ball valve, rotating from the valve open to the valve closed position. The handle can be released manually in cocking the handle, and moving toward the closed position. The shut-off valve of the present invention can easily be reset. The plumb will have naturally self-aligned itself over the centering cone placing the pendulum under the second ball to support the ball detent and raising the first ball up. The first ball is then in the loading position. The handle is then moved from the handle stop and rotated back. The slant on the back of the handle allows the handle to force the first ball down against the resistance of the ball detent spring, thereby allowing the ball detent to catch the detent claw of the elongate handle. The lower ball is centered and does not move during the cocking of the handle.

Referring to FIG. 9, the ball 160 is supported on a ball support platform 162 on a conical member 164. The base of the conical member contacts a spring means 166 that urges the conical member, and the attached pendulum 168 and pendulum weight 170 upwardly from a universally swinging pedulum 172 pendulum support which rests in a socket 174. A shock that moves the pendulum in any direction removes the ball support platform allowing the ball to fall downwardly. This in turn releases the retained elongate 176 arm, allowing it to swing freely. To cock the elongate arm, one pushes the arm over the ball, depressing the ball, and the entire pendulum assembly. When the lever arm has passed over the ball, it springs back thereby restraining the elongate arm from returning to the uncocked position. The spring means can be a spring as shown or other resilient material such as rubber, foam, or the like.

Figure 10:
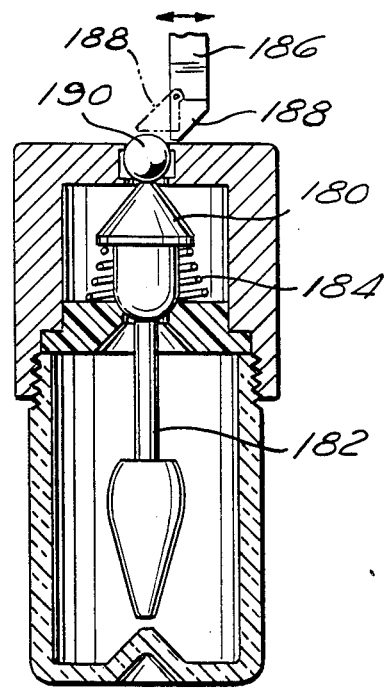
FIG. 10 shows a cut away view of a second alternate embodiment.

Referring to FIG. 10, the conical member 180 and the pendulum support 182 are a unitary member. A spring 184 urges the base of the conical member and the entire pendulum upwardly. The pendulum swings freely while supported by the spring.

The elongate member 186 arm has a hinged latch mechanism 186. The latch member swings upwardly (as shown in phantom) as it passes over the ball 190. The ball therefore does not have to be depressed to cock the lever arm. As in other embodiments, the lever arm swings to the uncocked position when the pendulum releases the ball.

The hinged latch can be any of a variety of other means, including a flexible strip. The strip bends over the ball when pushed into the cocked position and snaps back into the pre-cocked position.

The shutoff valve of the present invention can be used for stopping the flow of gases or liquid after a shock or by manually closing the lever. Gases include natural gas or industrial gases, such as may be found in oil refineries and the like. Liquids include gasoline, kerosine, and fuel oil, as well as water. Shocks can be from any source, although the most significant will be earthquakes.

I claim:
1. A shock actuated shut-off valve comprising:
   a valve, having an open position and a closed position, rotatably mounted within a valve body;
   a valve stem connected to the valve;
   an elongated handle connected to the valve stem engagement end and having a ball detent engagement end;
   means for urging said valve to rotate into the closed position;
   means for stopping further rotation of the valve when the valve is in the closed position;
   a ball detent having:

a ball detent housing;

a ball disposed within the ball detent housing;

a movable ball support for urging said ball upwardly;

a spring member for urging said movable ball support upwardly relative to said ball detent housing;

a pendulum having a ball detent engagement end and a plumb end, said pendulum responding to a shock by freeing the ball detent, thereby allowing the valve to move to the closed position.

2. The shut-off valve of claim 1, wherein said valve is a globe valve.

3. The valve of claim 1, wherein the movable ball support is urged upwardly relative to a pendulum support.

4. The valve of claim 1, wherein the movable ball support is integral with the pendulum support, and the spring urges the pendulum upwardly.

5. The shut off valve of claim 1, wherein the end of said elongate handle has a hingable engagement member.

6. The shut off valve of claim 1, wherein the end of said elongate handle has a spring loaded engagement member.

7. The shut-off valve of claim 1, wherein said means for urging said valve is a spring.

8. The shut-off valve of claim 7, wherein said spring engages said valve stem and said valve body.

9. A shock sensitive ball detent comprising:

a ball positioned to engage a movable member thereby restraining the movable member; and a pendulum having a ball detent engagement end and a plumb end, said ball supported by the ball engagement end; said pendulum responding to a shock by allowing the ball to fall, thereby freeing the movable member.

10. The ball detent of claim 9, wherein said pendulum is supported by a means that urges the pendulum into contact with the ball.

11. The ball detent of claim 9, wherein said ball detent engagement end is encircled by a universally swinging pendulum support and supported by a means that urges the ball detent engagement end away from the universally swinging pendulum support.

* * * * *